May 11, 1954     W. O. VEDDER     2,678,109
SELF-CLEANING AIR FILTER

Filed Sept. 2, 1950     2 Sheets-Sheet 1

WALTER O. VEDDER,
*INVENTOR.*

BY
*ATTORNEY*

May 11, 1954 — W. O. VEDDER — 2,678,109
SELF-CLEANING AIR FILTER
Filed Sept. 2, 1950 — 2 Sheets-Sheet 2

WALTER O. VEDDER,
*INVENTOR.*

BY
*ATTORNEY*

Patented May 11, 1954

2,678,109

UNITED STATES PATENT OFFICE 2,678,109

SELF-CLEANING AIR FILTER

Walter O. Vedder, Hagerstown, Md., assignor to Pangborn Corporation, Hagerstown, Md., a corporation of Maryland Application September 2, 1950, Serial No. 182,902

2 Claims. (Cl. 183—61)

1

The present invention relates to a continuous type of dust and fume collector or air filter and more particularly to a self-cleaning filter assembly for such a collector.

Among the objects of the present invention is the provision of improved self-cleaning air filter assemblies having a construction simpler than heretofore available.

The above as well as other objects of the present invention will be better understood from the following description of several of its exemplifications, taken in conjunction with the accompanying drawings in which.

According to the present invention a self-cleaning filter assembly for a dust and fume collector includes a cylindrical filter member, an air inlet pipe mounted within and rotatable about the cylindrical axis of the filter member, a sheet metal air guide wrapped around and fixed on the air inlet pipe, said guide having radially projecting sheet metal walls extending to the filter member and defining an air duct terminating at the outer ends of the walls in a narrow air discharge opening or nozzle extending substantially the entire length of the filter member, the wall of the pipe being cut away to establish air flow from the pipe to the duct. This air flow will remove dust collected by the filter, while the filter is being operated, so that the filter can be used continuously without the interruption that would otherwise be needed for shutting down to clean off the accumulated particles. The walls of the sheet metal air guide may carry sealing elements resiliently engaging the filter member to assist in guiding and concentrating the air flow to the filter member. By providing the filter member with a yieldable construction, it will be deflected or blown outwardly by the nozzle-directed air stream thereby assisting in loosening accumulated particles and simplifying their removal by the impinging air. The sheet metal walls of the nozzle may be provided with flaps bent to form covers over the sides of the duct.

Figure 1:
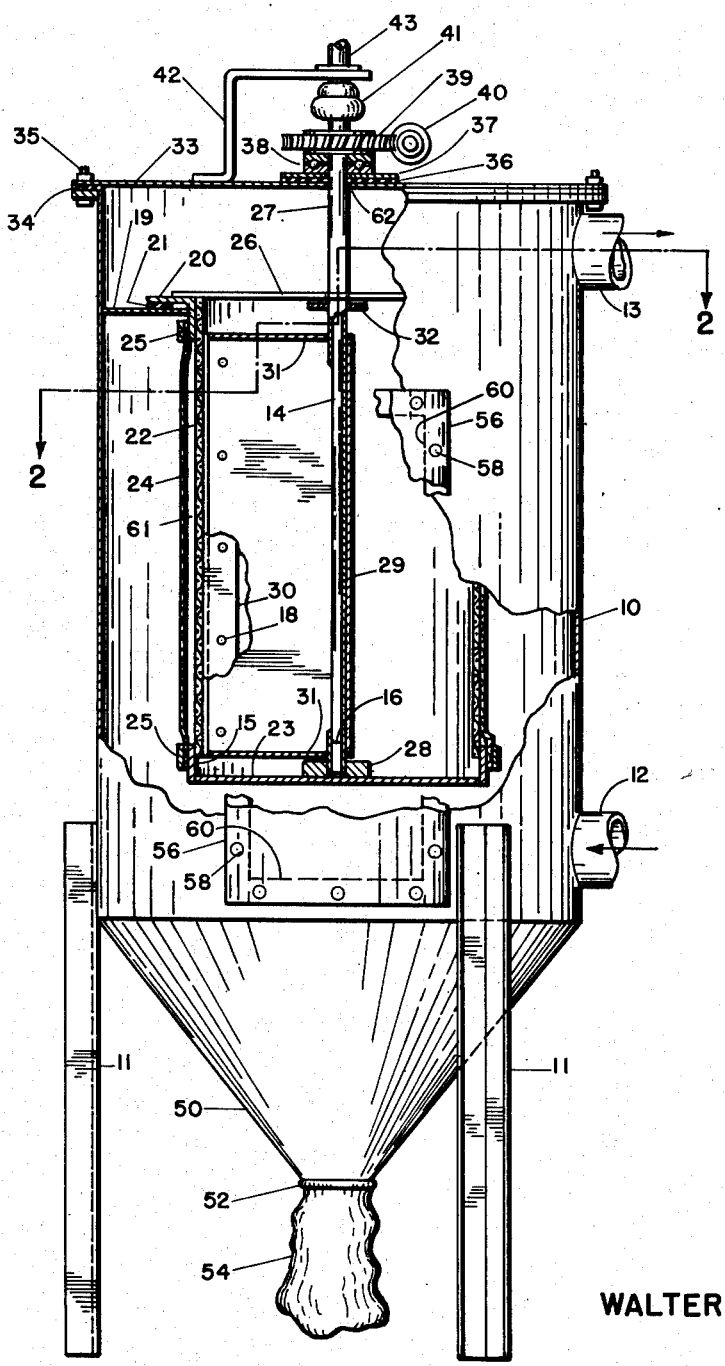
Fig. 1 is a vertical sectional view of a complete dust collecting apparatus incorporating one form of self-cleaning filter assembly of the invention.

Referring more particularly to the construction shown in Fig. 1, the dust and fume collector here shown consists of a suitable outer cylindrical or rectangular steel casing 10 vertically mounted on three or more angle supports 11 welded onto the

2 casing. An inlet pipe 12 for dust laden air is welded radially or tangentially to the lower end of the casing, the pipe diameter depending on the air capacity to be handled. A purified air outlet pipe 13 is welded at the top of the casing. Within the casing 10, at a suitable distance from the top, a sheet metal partition ring 19 is welded or secured into position. A flanged ring 20 and a washer 21 are fixed to the inner edge of the sheet metal ring as by means of bolts (not shown). The washer provides an air seal between the lower or dust chamber and the upper or clean air chamber. A cylindrical wire mesh or expanded metal screen 22 is welded at one end to the depending flange of the flanged ring 20 and extends downwardly with its lower end closed off by means of a sheet metal cover 23 which may also be welded in place, and has an upturned outer rim 15. A fibrous filter tube or bag 24 of woven, knitted, or felted construction is positioned around the screen and is fastened and sealed in place by means of a web strap 25 clamped at the top around the flange 20 and another strap clamped at the lower end of the cylinder to the rim 15 of the cover 23. A bridge bar 26 is shown as bolted across the flange 20 and has an opening at the center through which a hollow shaft or air pipe 27 is passed. The lower end of this hollow shaft is plugged as by pin 16, and is journalled in a plain bearing ring 28 welded onto the bottom cover 23. A guard or thrust washer 32 larger than the opening in the bridge bar is welded or shrunken onto the rotating shaft just below the bridge bar and thus holds the shaft in place.

Figure 2:
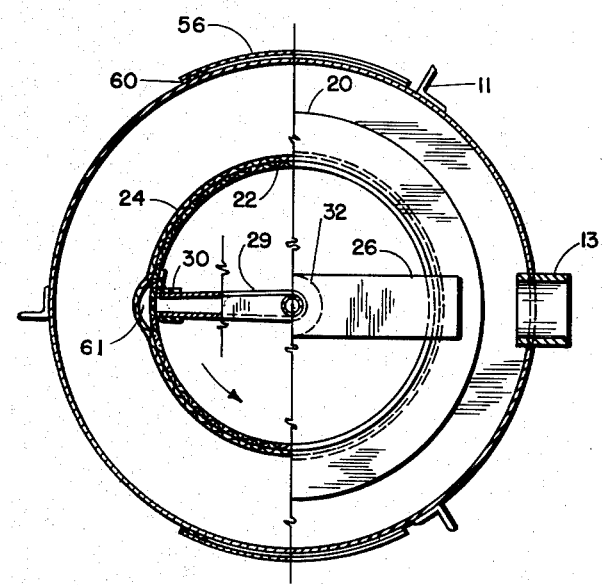
Fig. 2 is a horizontal sectional view taken along line 2—2, of the apparatus shown in Fig. 1.

Wrapped around the hollow shaft 27 is a sheet metal air guide or duct 29 which is secured in position against the shaft as by welding. The sheet metal air guide extends over substantially the entire length of screen 22 and projects radially from the shaft into close proximity with the screen. The thickness of the air guide walls need only be about $\frac{1}{32}$ of an inch, their shape being shown more clearly in Fig. 2. A continuous slot 14 is cut through the walls of the pipe 27 so that the air duct communicates with the interior of the pipe.

At the screen end of the duct 29, the duct walls are provided with lips or seals 30 of flexible material, such as rubber or rubberized fabric secured to the duct walls as by bolts 18. These seals reduce the leakage of air from the duct and assist in directing movement of air from the duct through the mesh screen as well as the fabric 24. The top and bottom ends of the air guide are closed off by means of two flaps 31 that may be welded in place and can conveniently be integral, suitably shaped, extensions of the duct walls. The top of casing 10 is shown as flanged and closed off with a cover 33, sealed by means of a washer 34 and secured by a set of bolts 35. At the center of the cover there is an opening 62 through which the rotating shaft extends up out of the casing. To prevent air leakage around the projecting shaft, a washer 36 and sealing plate 37 are provided. Above and secured to the sealing plate may be mounted a plain or a roller bearing 38. Keyed to the shaft is a pulley or a worm gear 39 which is connected for rotation as by a worm 40. An electric motor or other means (not shown) may be mounted directly on the cover 33 and geared or connected by a pulley and belt device to rotate the worm 40. At its upper end the hollow air pipe shaft 27 is connected by a swivelling or flexible coupling 41 shown as of the ball and socket type, to a fixed air supply line 43. A source of air or other gas under a pressure of about 30 pounds per square inch may be connected to the fixed line 43. An angle 42 welded onto the cover 33 assists in holding the fixed line 43 in place.

The casing 10, at its lower end, tapers down to form a hopper-like container section 50 terminating in a bottom opening which may be beaded over as shown in 52 for the attachment of a bag or sack 54. The sack may have an elastic top for more readily fitting over the bead 52 and holding it in place. Alternatively, a draw string arrangement may be used to hold the sack over the bead.

In order to be able to gain access to the interior of the casing around the filter cylinder, one or more removable panels 56 form part of the casing walls. The panel 56 shown in Fig. 1, is held in place by bolts 58 and sealed with gasket 60.

Dust-laden air enters the dust chamber 10 through the inlet pipe 12 either under suction or pressure and coarser dust particles carried by this air are precipitated through velocity reduction and centrifugal action. Tangential mounting of the inlet pipe improves the centrifugal action. This coarse dust settles through hopper 50 into sack 54. Air carrying fine dust passes through the filter fabric 24 which traps and retains the dust permitting the substantially dust-free air to move through to the interior of the cylindrical screen 22 and discharge through the open top of this screen to the clear air chamber above ring 19. The dust and fume particles collect on the surface of the fabric 24 and tend to increase resistance to air flow.

However, by supplying air under pressure to the line 43, the collected particles can be effectively removed from the filter without interfering with the filtering action. The sheet metal air guide directs the air from line 43 against a localized strip of the filter element 24, and the collected particles are blown off the exterior of the filter by this air. By shifting or rotating the pipe shaft 27, the mouth of duct 29 can be swept over the entire periphery of the filter fabric 24, to remove all the collected particles and rejuvenate the filter for further filtering.

It has been found that the cleaning of filter cloth 24 is considerably improved if the filter fabric is yieldably constructed so that when an air stream is directed upon it, it bulges or yields outwardly at the duct opening at least about one-fourth of an inch away from the screen, as shown at 61.

This yielding or flexing, loosens the collected dust particles so that a lower air pressure will more readily blow them off the filter. If desired, however, the filter element 24 may be tightly held on the screen, or may even be made integral with the screen as by weaving filter cloth threads with metal supporting threads. The shaft carrying the inlet air may be rotated either continuously or intermittently, manually or by means of a power drive, such as the electric motor described above.

The discharge hopper 50 of the casing may include a shut-off valve (not shown) so that it may be completely shut off when the dust bag 54 is removed. Alternatively, an automatic disposal arrangement may be provided, as by mounting a vaned rotor at the bottom of the hopper 50 together with an outlet connected to a conveyor or waste line. The rotor is arranged so that by rotation the vanes carry out any particles that collect at the bottom of the hopper, and yet at the same time, the vanes provide an air seal preventing the escape of air carrying the floating dust particles.

Figure 3:
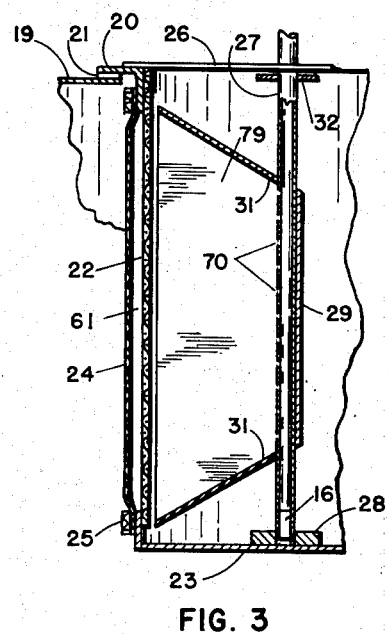
Fig. 3 is a detail view of a modified assembly embodying the invention.

Fig. 3 shows a modified form of air dust arrangement in which the pipe shaft 14 has a plurality of discharge openings 70. The air duct 79, in this construction tapers from a large height adjacent the screen 22 down to a relatively short height where it is secured to the pipe 27. The short height may be as little as one-half the screen height if desired or even less. No nozzle seals are shown in this modification, although they can be used if desired.

One of the features of this invention is that the air duct is provided at a minimum cost and calls for the minimum amount of components. In operation, it shows excellent results, particularly where the filter fabric is yieldable as described above. While certain novel features of the invention have been disclosed and are pointed out in the annexed claims, it will be understood that various omissions, substitutions and changes may be made by those skilled in the art without departing from the spirit of the invention.

I claim:

1. A self-cleaning filter assembly for a dust and fume collector, said assembly comprising in combination a hollow cylindrical filter member, a rigid air inlet pipe rotatably mounted in spaced relation within the filter member and along its cylindrical axis for rotation about said axis, a sheet metal air guide wrapped around and fixed on the air inlet pipe, said guide having radially projecting sheet metal walls extending to the filter member and defining an air duct terminating at the outer ends of the walls in a narrow air discharge opening extending substantially the entire length of the filter member, the wall of the pipe being cut away to establish air flow from the pipe to the duct, and the sheet metal duct walls include integral flaps bent to form covers secured over the top and bottom of the duct.

2. A self-cleaning filter assembly for a dust and fume collector, said assembly comprising in combination a hollow cylindrical filter member, an air inlet pipe rotatably mounted in spaced relation within the filter member and along its cylindrical axis for rotation about said axis, a sheet metal air guide wrapped around and fixed on the air inlet pipe, said guide having radially projecting sheet metal walls extending to the filter member and defining an air duct terminating at the outer ends of the walls in a narrow air discharge opening extending substantially the entire length of the filter member, the walls of said guide having sealing elements mounted thereon and resiliently engaging the filter member to assist in guiding the air flow to the filter member, the wall of the pipe being cut away to establish air flow from the pipe to the duct, said filter member being yieldable and providing for deflection of at least about ¼ inch by the impinging air stream from said nozzle, and the sheet metal walls of said guide further including integral flaps bent to form covers secured over the top and bottom portions of the duct thus formed.

References Cited in the file of this patent

UNITED STATES PATENTS

| Number | Name | Date |
|---|---|---|
| 1,043,551 | Thurman | Nov. 5, 1912 |
| 1,526,280 | Henrich | Feb. 10, 1925 |
| 1,847,368 | Wendler | Mar. 1, 1932 |
| 2,026,834 | Holly | Jan. 7, 1936 |
| 2,398,233 | Lincoln | Apr. 9, 1946 |
| 2,474,478 | Hart | June 28, 1949 |
| 2,559,428 | Hersey | July 3, 1951 |
| 2,591,198 | Ringe | Apr. 1, 1952 |

FOREIGN PATENTS

| Number | Country | Date |
|---|---|---|
| 3,876 | Great Britain | Feb. 14, 1913 |
| 148,799 | Great Britain | Oct. 10, 1921 |
| 650,379 | Germany | Sept. 21, 1937 |